United States Patent
Merlin et al.

(10) Patent No.: US 9,124,460 B2
(45) Date of Patent: Sep. 1, 2015

(54) RULES FOR MULTIPLEXING DATA OF DIFFERENT ACCESS CATEGORIES IN MULTI USER MIMO WIRELESS SYSTEMS

(75) Inventors: Simone Merlin, San Diego, CA (US); Santosh Paul Abraham, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 204 days.

(21) Appl. No.: 13/219,531

(22) Filed: Aug. 26, 2011

(65) Prior Publication Data

US 2012/0218947 A1 Aug. 30, 2012

Related U.S. Application Data

(60) Provisional application No. 61/378,567, filed on Aug. 31, 2010.

(51) Int. Cl.
  *H04L 25/03* (2006.01)
  *H04L 5/00* (2006.01)
  *H04L 25/02* (2006.01)
  *H04W 74/00* (2009.01)

(52) U.S. Cl.
  CPC .... *H04L 25/03343* (2013.01); *H04L 25/03968* (2013.01); *H04L 5/0023* (2013.01); *H04L 5/0064* (2013.01); *H04L 25/021* (2013.01); *H04L 25/0248* (2013.01); *H04L 2025/03426* (2013.01); *H04W 74/00* (2013.01)

(58) Field of Classification Search
  CPC ............ H04L 5/0023; H04L 25/03343; H04L 25/03968; H04L 5/0064; H04L 25/021; H04L 25/0248; H04L 2025/03426; H04W 74/00
  See application file for complete search history.

(56) References Cited

U.S. PATENT DOCUMENTS

| | | | |
|---|---|---|---|
| 7,519,038 B2 | 4/2009 | Zhao et al. | |
| 7,684,333 B1 | 3/2010 | Dasylva et al. | |

(Continued)

FOREIGN PATENT DOCUMENTS

| | | | |
|---|---|---|---|
| CN | 101292473 A | 10/2008 | |
| CN | 101616130 A | 12/2009 | |

(Continued)

OTHER PUBLICATIONS

IEEE P802.11ac TM/D1.0 "Draft Standard for Information Techonology—Telecommunications and information exchange between systems—Local and metropolitan area networks—Specific requirements—Part 11: Wireless LAN Medium Access Control (MAC) and Physical Layer (PHY) specifications—Amendment 5: Enhancements for Very High Throughput for Operation in Bands below 6 GHz" Prepared by the 802.11 Working Group of the 802 Committee, May 2011, pp. 1-242.

(Continued)

*Primary Examiner* — Alpus H Hsu
*Assistant Examiner* — Walter Divito
(74) *Attorney, Agent, or Firm* — Dang M. Vo

(57) ABSTRACT

Certain aspects of the present disclosure relate to a technique for multiplexing data of different access categories in Multi User Multiple Input Multiple Output (MU-MIMO) wireless systems. The present disclosure defines rules for multiplexing data of an access category that did not win the contention together with data that won the contention. In this way, a desired Quality of Service (QoS) of each access category class can be preserved.

40 Claims, 5 Drawing Sheets

(56) References Cited

U.S. PATENT DOCUMENTS

| | | | |
|---|---|---|---|
| 7,684,430 B2 | 3/2010 | Gaur et al. | |
| 8,139,593 B2 | 3/2012 | Dravida et al. | |
| 2002/0158801 A1* | 10/2002 | Crilly et al. | 342/378 |
| 2006/0114867 A1 | 6/2006 | Du et al. | |
| 2007/0206547 A1 | 9/2007 | Gong et al. | |
| 2008/0002636 A1 | 1/2008 | Gaur et al. | |
| 2008/0112351 A1 | 5/2008 | Surineni et al. | |
| 2008/0186913 A1 | 8/2008 | Ahn et al. | |
| 2009/0310692 A1 | 12/2009 | Kafle et al. | |
| 2011/0194644 A1* | 8/2011 | Liu et al. | 375/295 |
| 2011/0222408 A1* | 9/2011 | Kasslin et al. | 370/241 |
| 2011/0268094 A1* | 11/2011 | Gong et al. | 370/338 |
| 2012/0320856 A1* | 12/2012 | Kim et al. | 370/329 |

FOREIGN PATENT DOCUMENTS

| | | | |
|---|---|---|---|
| JP | 2008011509 A | 1/2008 | |
| JP | 2013520092 A | 5/2013 | |
| JP | 2013531404 A | 8/2013 | |
| WO | 2007064976 A1 | 6/2007 | |
| WO | 07115199 | 10/2007 | |
| WO | WO-2011100467 A2 | 8/2011 | |
| WO | WO-2011132847 A1 | 10/2011 | |

OTHER PUBLICATIONS

IEEE Standards Department: "Draft Supplement to Standard for Telecommunications and Information Exchange Between Systems; LAN/MAN specific requirements; part 11; Wireless Medium Access Control (MAC) and Physical Layer (PHY) Specifications; Medium Access Control (MAC) Enhancements for Quality of Service (QoS)" vol. IEEE 802.11 e, No. D4.3, May 1, 2003, pp. 1-131, XP002517540.

International Search Report and Written Opinion—PCT/US2011/049779—ISA/EPO—Feb. 6, 2012.

Jaunty Ty Ho:"QoS-, Queue-and Channel-Aware Packet Scheduling for Multimedia Services in multiuser SDMA/TDMA Wireless Systems", IEEE Transactions on Mobile Computing, IEEE Service Center, Los Alamitos, CA, US, vol. 7, No. 6, Jun. 1, 2008, pp. 751-763, XP011202660, ISSN:1536-1233 p. 752, left-hand column p. 755, left-hand column.

Liu Q., et al., "A Cross-Layer Scheduling Algorithm With QoS Support in Wireless Networks", IEEE Transactions on Vehicular Technology, May 1, 2006, XP55013998.

* cited by examiner

RULES FOR MULTIPLEXING DATA OF DIFFERENT ACCESS CATEGORIES IN MULTI USER MIMO WIRELESS SYSTEMS

CLAIM OF PRIORITY UNDER 35 U.S.C. §119

The present Application for patent claims benefit of U.S. Provisional Patent Application Ser. No. 61/378,567, entitled, "Rules for multiplexing data of different access categories in multi user MIMO wireless systems", filed Aug. 31, 2010 and assigned to the assignee hereof and hereby expressly incorporated by reference herein.

BACKGROUND

1. Field

Certain aspects of the present disclosure generally relate to wireless communications and, more particularly, to a method for multiplexing data of different access categories in Multi User Multiple Input Multiple Output (MU-MIMO) wireless systems.

2. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 WLAN standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for communications. The apparatus generally includes a first circuit configured to allocate a first set of one or more streams within a multi-user (MU) frame for transmitting data associated with a primary Access Category (AC), wherein the first circuit is also configured to allocate a second set of one or more streams within the MU frame different from the first set for transmitting data associated with a secondary AC from a set of eligible ACs, once the first set comprises a largest number of streams among all numbers of streams that can be allocated for the data associated with the primary AC, and a transmitter configured to transmit the data associated with the primary and secondary ACs using the first and second sets of streams.

Certain aspects of the present disclosure provide a method for communications. The method generally includes allocating a first set of one or more streams within a multi-user (MU) frame for transmitting data associated with a primary Access Category (AC), allocating a second set of one or more streams within the MU frame different from the first set for transmitting data associated with a secondary AC from a set of eligible ACs, once the first set comprises a largest number of streams among all numbers of streams that can be allocated for the data associated with the primary AC, and transmitting the data associated with the primary and secondary ACs using the first and second sets of streams.

Certain aspects of the present disclosure provide an apparatus for communications. The apparatus generally includes means for allocating a first set of one or more streams within a multi-user (MU) frame for transmitting data associated with a primary Access Category (AC), means for allocating a second set of one or more streams within the MU frame different from the first set for transmitting data associated with a secondary AC from a set of eligible ACs, once the first set comprises a largest number of streams among all numbers of streams that can be allocated for the data associated with the primary AC, and means for transmitting the data associated with the primary and secondary ACs using the first and second sets of streams.

Certain aspects of the present disclosure provide a computer-program product for communications. The computer-program product generally includes a computer-readable medium comprising instructions executable to allocate a first set of one or more streams within a multi-user (MU) frame for transmitting data associated with a primary Access Category (AC), allocate a second set of one or more streams within the MU frame different from the first set for transmitting data associated with a secondary AC from a set of eligible ACs, once the first set comprises a largest number of streams among all numbers of streams that can be allocated for the data associated with the primary AC, and transmit the data associated with the primary and secondary ACs using the first and second sets of streams.

Certain aspects of the present disclosure provide an access point. The access point generally includes at least one antenna, a first circuit configured to allocate a first set of one or more streams within a multi-user (MU) frame for transmitting data associated with a primary Access Category (AC), wherein the first circuit is also configured to allocate a second set of one or more streams within the MU frame different from the first set for transmitting data associated with a secondary AC from a set of eligible ACs, once the first set comprises a largest number of streams among all numbers of streams that can be allocated for the data associated with the primary AC, and a transmitter configured to transmit, via the at least one antenna, the data associated with the primary and secondary ACs using the first and second sets of streams.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
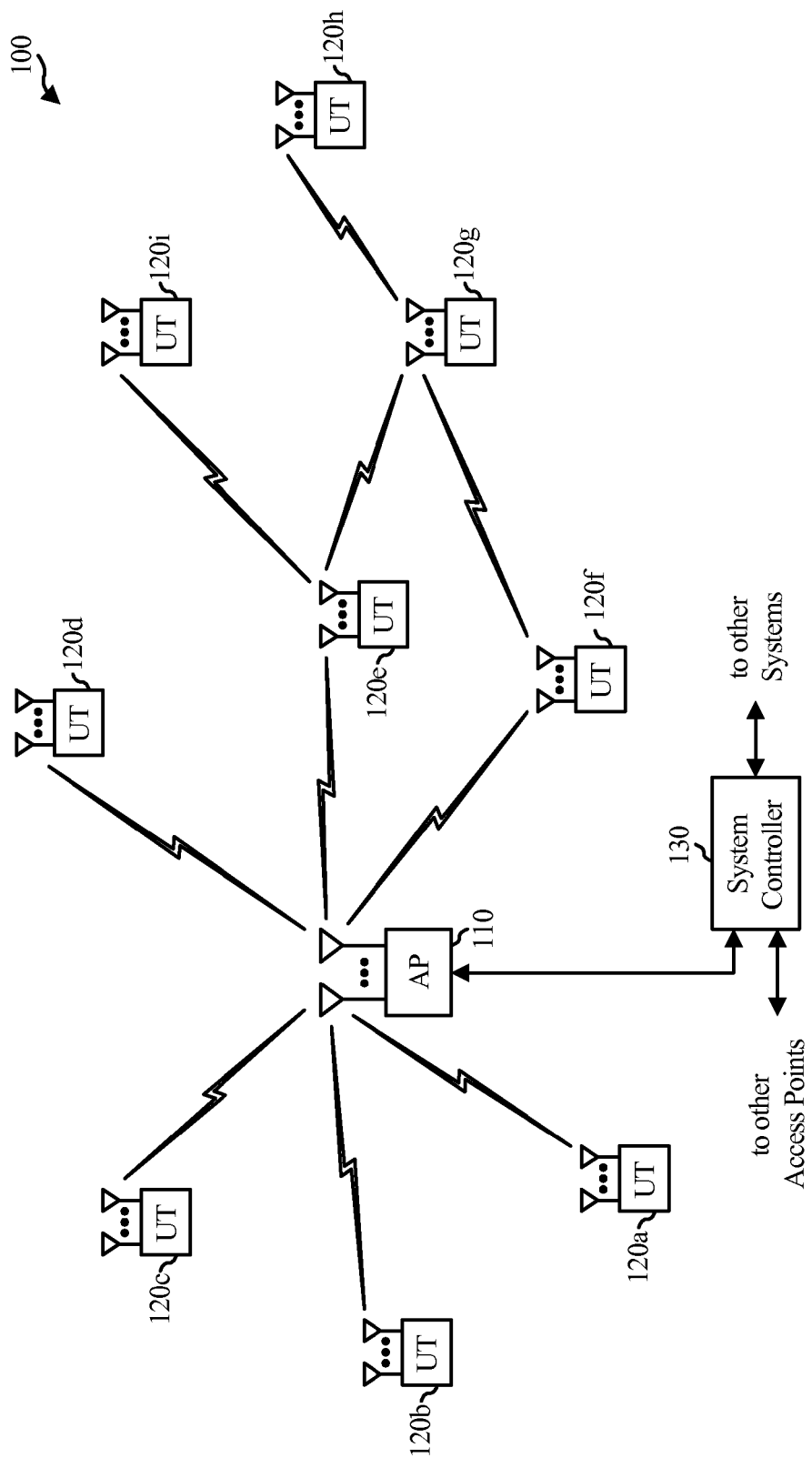
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission.

Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
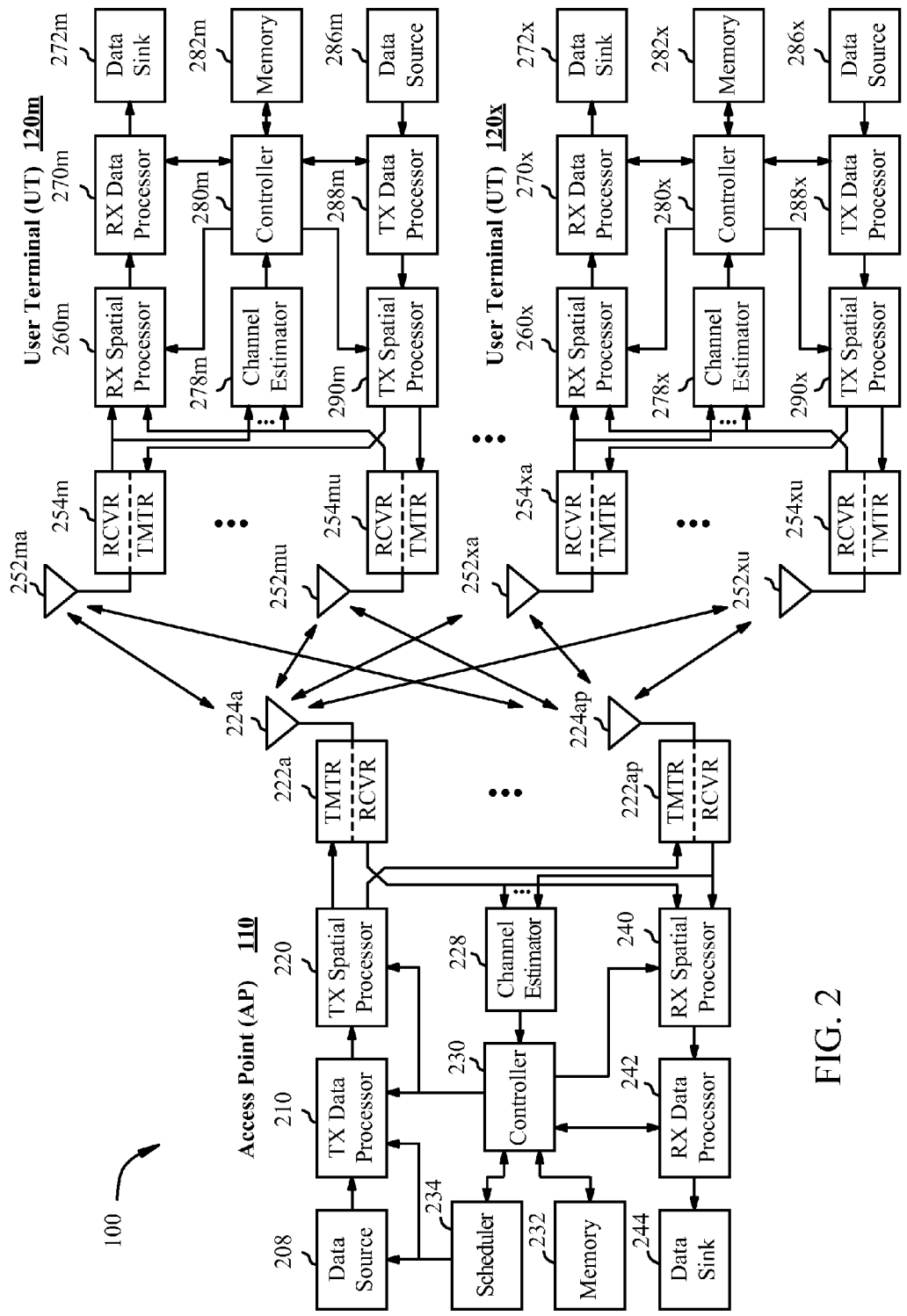
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{dp}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

The wireless system 100 illustrated in FIGS. 1-2 may operate in accordance with IEEE 802.11ac wireless communications standard. The IEEE 802.11ac represents a new IEEE 802.11 amendment that allows for higher throughput in IEEE 802.11 wireless networks. The higher throughput may be realized through several measures such as parallel transmissions to multiple user stations (STAs) at once, or by using a wider channel bandwidth (e.g., 80 MHz or 160 MHz). The IEEE 802.11ac is also referred to as Very High Throughput (VHT) wireless communications standard.

The IEEE 802.11ac allows to multiplex data of different access categories in a single multiuser transmission. Therefore, it may be required to define rules for correct multiplexing of data belonging different access categories. Certain aspects of the present disclosure define rules for multiplexing, at the access point 110, data of an access category that did not win the contention together with data that won the contention. In this way, a desired Quality of Service (QoS) of each access category class may be preserved. In an aspect, the multiplexed data belonging to different access categories may be transmitted from the access point 110 to one or more of the user terminals 120.

Figure 3:
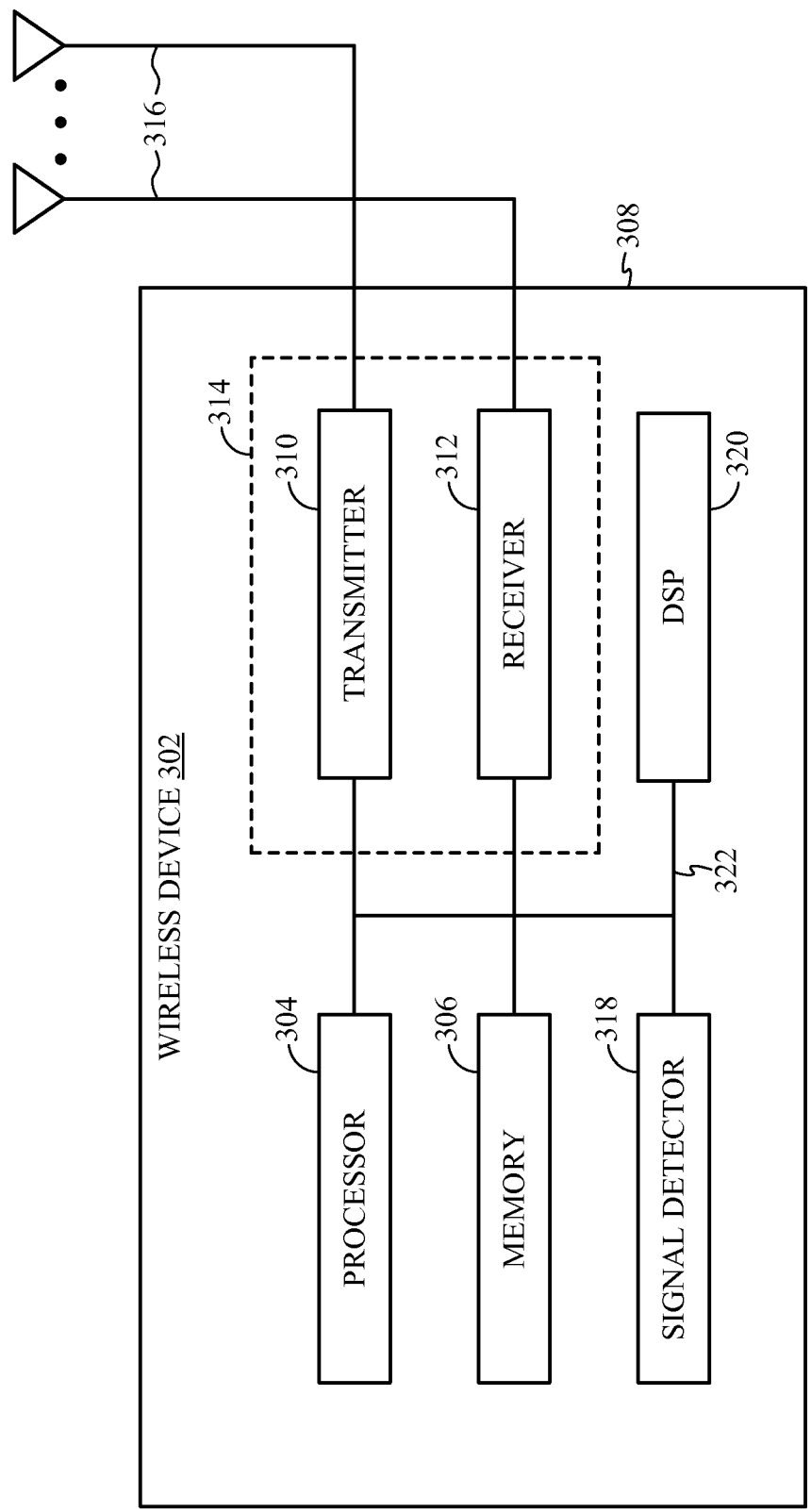
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

Certain aspects of the present disclosure define rules for multiplexing, at the wireless device 302, data of an access category that did not win the contention together with data that won the contention. In this way, a desired QoS of each access category class may be preserved. In an aspect, the multiplexed data belonging to different access categories may be transmitted from the wireless device 302 to one or more user terminals (not shown in FIG. 3). In another aspect, the wireless device 302 may be configured to receive and process data belonging to different access categories that may be multiplexed at an access point serving the wireless device 302.

The various components of the wireless device 302 may be coupled together by a bus system 322, which may include a power bus, a control signal bus, and a status signal bus in addition to a data bus.

Enhanced Distributed Coordinated Access

Figure 4:
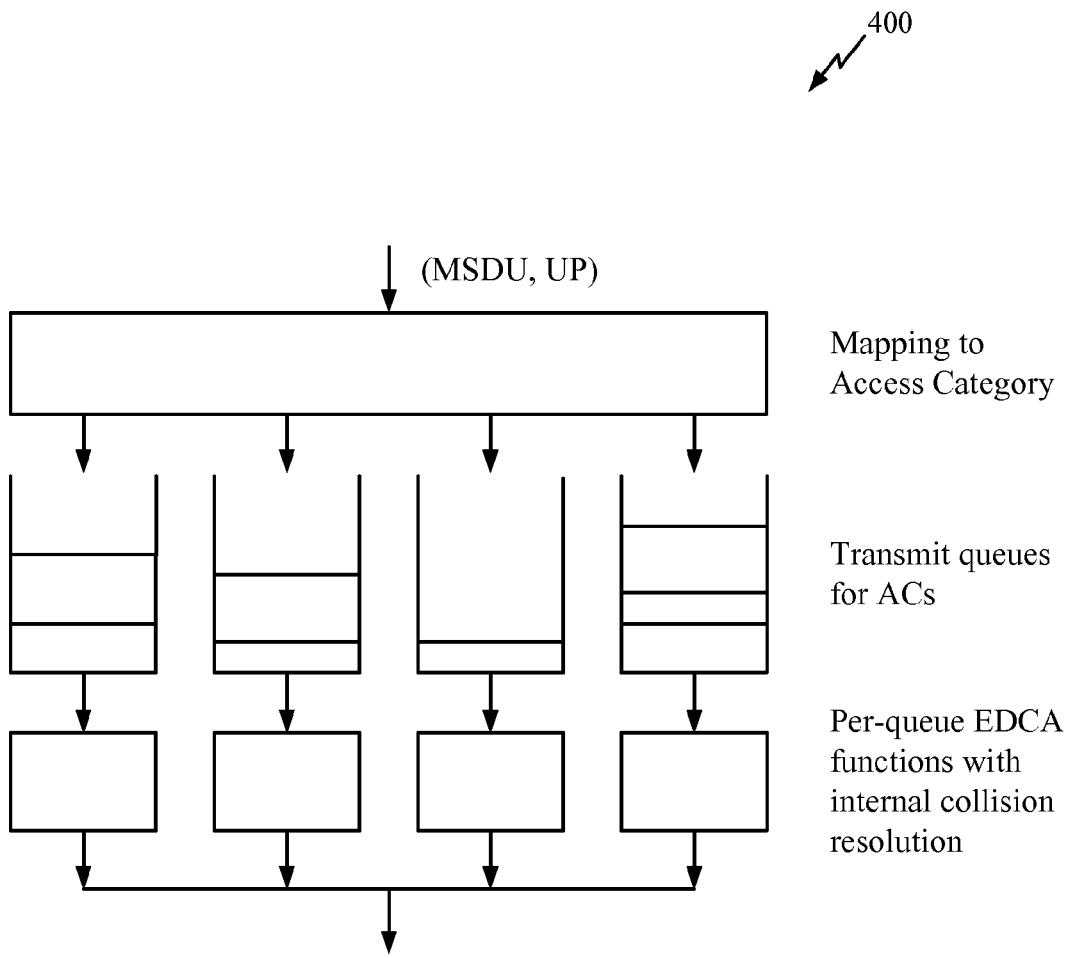
FIG. 4 illustrates an example of Enhanced Distributed Coordinated Access (EDCA) in accordance with certain aspects of the present disclosure.

In IEEE 802.11 based networks, priority access for traffic based on an access category may be provided in accordance with Enhanced Distributed Coordinated Access (EDCA) procedure. In EDCA-based access, as illustrated in FIG. 4, data for different Access Categories (ACs) may be separated in different transmit queues. For each transmit queue, an access point (AP) may contend for channel access using a set of parameters that correspond to the AC of the transmit queue. In an aspect, two contention parameters may be AC Inter Frame Space (AIFS) and Contention Window (CW). The AIFS and CW may be chosen so that one AC may be given a greater chance of accessing the medium than another AC. For example, video (VI) traffic may be assigned to an AC which has a lower AIFS and CW than Best Effort (BE) data.

Multi User MIMO (MU-MIMO) may enable an AP to transmit data to multiple destination stations (STAs). For MU-MIMO enabled APs, it may be inefficient to only allow traffic of a particular AC when access for that AC is obtained through EDCA. A network throughput may be diminished if available spatial streams from the AP are not utilized due to unavailability of data for the particular class for which the access was obtained, while data for another AC is available. However, arbitrary multiplexing of data from different ACs may cause a size of transmitted Physical layer convergence procedure Protocol Data Unit (PPDU) to grow.

It should be noted that if additional spatial streams are added to a downlink MU-MIMO transmission, the effective signal-to-interference-plus-noise ratio (SINR) obtained by the individual streams may get diminished. Therefore, a modulation coding scheme (MCS) that each of the individual streams can use may be reduced, and hence the duration of the PPDU may increase. This may cause unfairness among different APs that access the medium. For example, if one AP has more BE data and less high priority VI data, and that AP multiplexes the BE data with the VI data in an access obtained for VI traffic, then the additional time incurred due to the multiplexed BE data may cause the particular AP to be unfair to another AP that has only high priority VI data.

Certain aspects of the present disclosure support methods of multiplexing traffic of different classes while retaining the desirable characteristics of EDCA, such as traffic class differentiation and guaranteeing of QoS.

QoS Aware Efficient Multiplexing of Access Categories

A set of primary AC data eligible to be transmitted in MU-MIMO may be first defined. In one aspect, a set of primary AC data may comprise data of the class that won the contention and for which channel state information (CSI) is available. Further, a set of secondary AC data eligible to be transmitted in MU-MIMO may be also defined. In one aspect, the set of secondary AC data may comprise data of the class that didn't win the contention, but for which CSI is available.

Further, the set of secondary AC data may comprise data of a restricted set of ACs. For example, only VI data may be multiplexed with voice (VO) data, while background (BK) data may be multiplexed with BE data only. Therefore, the set of eligible secondary ACs may be based on the primary AC. In an aspect, a priority of the AC VO may be higher than a priority of the AC VI, the priority of AC VI may be higher than a priority of the AC BE, and the priority of AC BE may be higher than a priority of the AC BK.

At each Multi User PPDU (MU-PPDU), available streams may be first allocated to primary data. Once no primary data can be added to the MU-PPDU, an AP may decide to utilize remaining streams to serve secondary AC data.

In an aspect, duration of transmission for the streams delivering secondary AC data may not exceed transmission duration of the streams transmitting primary AC data. Practically, the AP may compute the MCS based on a number of spatial streams comprising the ones used for a secondary AC. Then, the AP may create a packet for primary AC and may compute its duration. Following that, the AP may add secondary data so as to create secondary packets with at most the length of the primary transmission. In an aspect, duration of the PPDU (or multiple PPDUs) may not exceed the transmission opportunity limit for the primary AC data.

Following aspects of the present disclosure provide additional restriction on the method how multiplexing of data of different classes can be realized.

Certain aspects of the present disclosure utilize a pre-defined PPDU size increase tolerance. For each access category, a tolerance parameter t(i, j) may be defined, where t denotes an amount by which a size of PPDU comprising data of a primary AC (ACi) may be allowed to grow due to addition of data of another AC (e.g., data of a secondary access category ACj). The following example illustrates how the tolerance parameter may be used; a medium access may be obtained for the primary AC, i.e., ACi.

First, the minimum PPDU size $M_i$ required to transmit the data of ACi may be computed. Then, the data of ACj may be added up to the size such that the total PPDU size with data of ACj may be equal to $M_i(1+t(i, j))$.

It should be noted that data length with this increase may not exceed pre-set maximum transmission opportunity duration. Data length extension may depend on the amount of primary AC data. In one aspect, the utilized tolerance parameter t(i, j) may be broadcast by the AP. In another aspect, the AP may be negotiating, with neighboring APs, the exact tolerance parameter being used.

Certain aspects of the present disclosure support a method of determining the maximum extension of PPDU of the primary AC (i.e., ACi) based on the amount of primary AC data carried in the PPDU. The minimum PPDU size M(i) may be first computed with data of primary AC. A number of available spatial streams can be denoted as $N_{free}$. After this, a number of bytes per spatial stream ($N_{BYTES}$) and MCS ($MCS_i$) used by the STA with the longest aggregate in the PPDU for the minimum PPDU size may be obtained.

$N_{free}$ pseudo spatial streams each with $N_{BYTES}$ virtual data at $MCS_i$ may be added, and a new size $M_{MUX}(i)$ of virtually extended PPDU may be computed. It should be noted that in computing $M_{MUX}(i)$, the AP may be required to account for the event that a different MCS may be required with pseudo spatial streams as opposed to the MCS used in computing M(i). Finally, data of secondary ACs may be added to aggregate so that the resulting size of PPDU does not extend above the value of $M_{MUX}(i)$ Certain aspects of the present disclosure support incrementing backoff windows of multiplexed secondary class. When data of a secondary AC is multiplexed with data of a primary AC, the size of transmitted PPDUs and/or time utilized on the air may increase. This increased time may diminish a throughput of primary AC data at other APs and STAs. One approach to counter the potential diminishing of throughput may be to reduce the probability of winning the contention of medium access for access category $AC_j$ that represents a secondary access. This may be preformed based on the amount of either the data being carried when $AC_j$ was carried as a secondary AC and/or the frequency of access obtained as a secondary AC.

In one aspect of the present disclosure, a backoff counter of an AC may be restarted every time the AC obtains access as a secondary AC. Any residual count of the backoff counter may be replaced by a newly generated random value corresponding to a contention window (CW) of the secondary AC.

In another aspect of the present disclosure, the residual backoff of an AC (that is a secondary AC) may be incremented by an amount that is based on a CW of a primary AC. Let $r_j$ denote the residual count for the secondary AC that obtains access through a primary $AC_i$. Then, the residual count of the secondary AC may be incremented as:

$$r_j(\text{new}) = r_j \cdot \max(1, CW_j/CW_i). \quad (1)$$

In yet another aspect of the present disclosure, the backoff window of the multiplexed secondary class may be increased based on a mean throughput. Let T(j) denotes the mean throughput of $AC_j$ as defined by Traffic Specification (TSPEC) requirements for $AC_j$ traffic. Let $T_{actual}(j)$ denotes a measured throughput of $AC_j$ obtained by measuring the throughput over a pre-determined time window or using a pre-determined moving average function. Then, the increment of the residual backoff for $AC_j$ may be based on the ratio of T(j) and $T_{actual}(j)$, i.e.:

$$r_j(\text{new}) = r_j \cdot \max(1, T(j)/T_{actual}(j)). \quad (2)$$

Certain aspects of the present disclosure support generating dynamic hybrid classes (i.e., hybrid AC). In this method, an AP may decide prior to the beginning of backoff countdown on the primary $AC_i$ what the PPDU size would be without secondary $AC_j$ data (i.e., the size of $M_i$) and with adding secondary $AC_j$ data (i.e., the size of $M_{ij} \geq M_i$). It should be noted that determining the amount of secondary AC data to add may be based on one of the aforementioned methods. After this, the AP may generate a random backoff count based on the CW of primary class, and it may scale the obtained random backoff count according to ratio ($M_{ij}/M_i$). In addition, the AP may also increment the AIFS parameter to be used for the contention procedure for the multiplexed PPDU.

In a first step of the aforementioned method, a random value cw(i) may be generated according to the CW of primary AC (i.e., $CW_i$). After that, in a second step, a new value $cw_{hybrid}$ (i, j) corresponding to the hybrid AC may be computed as:

$$cw_{hybrid}(i,j) = cw(i) \cdot f(M_{ij}/M_i). \quad (3)$$

In a third step, once the value $cw_{hybrid}$ (i, j) is computed, the countdown may begin from this particular value.

In addition to the above steps, the AP may choose to revert to the original value cw(i) if the AP determines that the reduction in the contention window count (e.g., due to medium condition) is not fast enough to meet the QoS constraints of the primary class $AC_i$. In this case, the PPDU would be of size $M_i$, and it may only comprise data for the primary class $AC_i$.

In one aspect of the present disclosure, an AP may switch between AC multiplexing/not multiplexing based on tracking if the QoS requirements according to TSPEC are met for a particular primary AC. If the TSPEC QoS requirements are met, then the AP may add data of secondary ACs and continue to track the compliance of the primary AC data to the TSPEC. On the other hand, if one or more measured QoS parameters of $AC_i$ (e.g., a throughput) are determined to be lower than requirements specified by the TSPEC and/or the obtained latency is determined to be higher than the TSPEC requirement, then the AP may disable AC multiplexing when $AC_i$ is the primary AC. Further, the AP may also disable AC multiplexing for other ACs.

In one aspect of the present disclosure, intolerance to AC multiplexing may be explicitly indicated. For example, if an AP determines that the QoS requirements of its own traffic are not being met, then the AP may indicate intolerance to AC multiplexing in the network by marking a bit in an omni-directional signal (SIG) field header of a transmission preamble or by sending a control message to other neighboring APs. The AP may make this determination after observing that transmissions from the neighboring networks are MU-MIMO transmissions by decoding SIG type A field(s) of the preamble.

Figure 5:
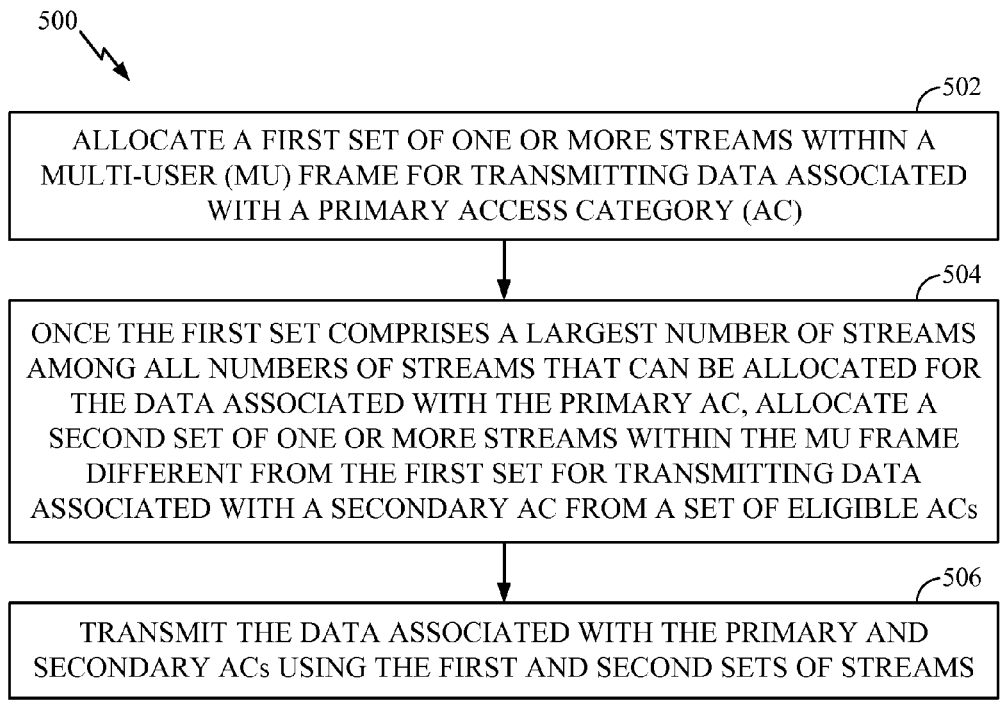
FIG. 5 illustrates example operations that may be performed at an access point in accordance with certain aspects of the present disclosure.

FIG. 5 illustrates example operations 500 that may be performed at an access point in accordance with certain aspects of the present disclosure. At 502, the access point may allocate a first set of one or more streams within a multi-user (MU) frame for transmitting data associated with a primary Access Category (AC). In an aspect, the MU-frame may comprise at least one MU-PPDU. At 504, once the first set comprises a largest number of streams among all numbers of streams that can be allocated for the data associated with the primary AC, the access point may allocate a second set of one or more streams within the MU frame different from the first set for transmitting data associated with a secondary AC from a set of eligible ACs. At 506, the access point may transmit the data associated with the primary and secondary ACs using the first and second sets of streams.

In an aspect, the secondary AC may have a higher priority order than the primary AC. In another aspect, the secondary AC may have at most one order of priority below the primary AC. In an aspect, the numbers of streams that can be allocated may comprise a number of streams of apparatuses (e.g., access terminals) that are destinations of the data associated with the primary AC.

In an aspect, a circuit of the access point may be configured to adjust a backoff counter associated with the secondary AC to reduce a probability of wining contention for medium access for the secondary AC. The adjustment of backoff counter may comprise at least one of: restarting the backoff counter, replacing a residual count of the backoff counter with a random value corresponding to a contention window (CW) of the secondary AC, increasing a residual count of the backoff counter by an amount based on a CW of the primary AC and a CW of the secondary AC, or increasing a residual count of the backoff counter by an amount based on an average throughput required for the secondary AC as defined by TSPEC and a throughput of the data associated with the secondary AC.

Figure 5A:
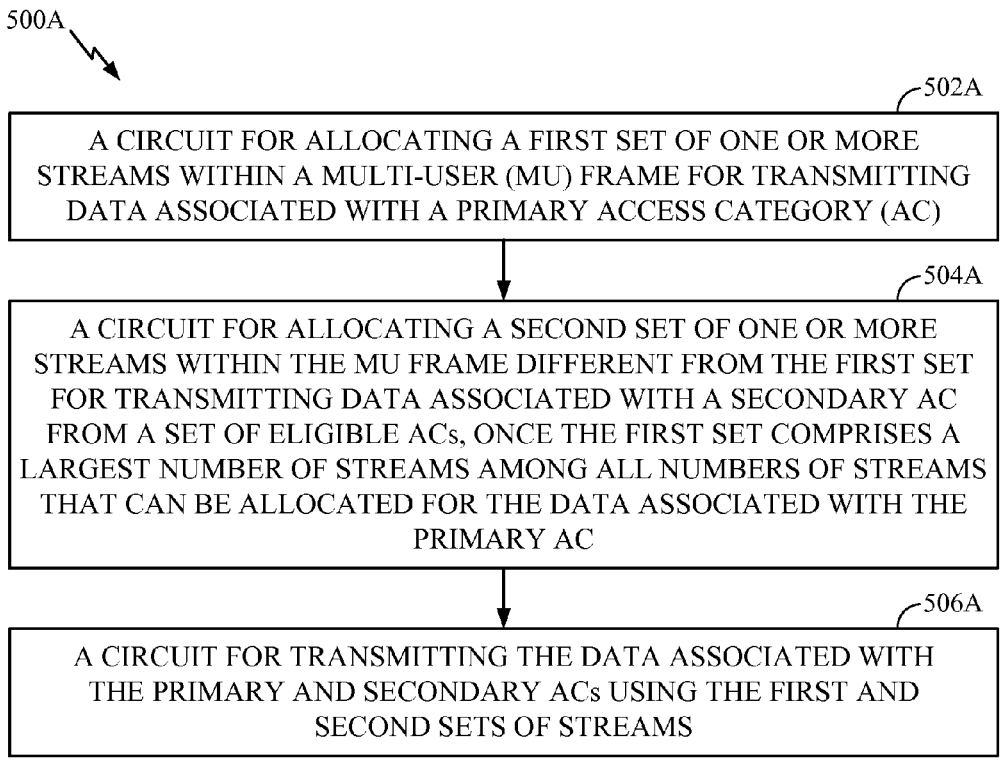
FIG. 5A illustrates example components capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500 illustrated in FIG. 5 correspond to components 500A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for allocating may comprise an application specific integrated circuit, e.g., the processor 210 from FIG. 2 of the access point 110, or the processor 304 from FIG. 3 of the wireless device 302. The means for transmitting may comprise a transmitter, e.g., the transmitter 222 from FIG. 2 of the access point 110, or the transmitter 310 from FIG. 3 of the wireless device 302. The means for computing may comprise an application specific integrated circuit, e.g., the processor 210 or the processor 304. The means for extending may comprise an application specific integrated circuit, e.g., the processor 210 or the processor 304. The means for generating may comprise an application specific integrated circuit, e.g., the processor 210 or the processor 304. The means for adjusting may comprise an application specific integrated circuit, e.g., the processor 210 or the processor 304. The means for restarting may comprise an application specific integrated circuit, e.g., the processor 210 or the processor 304. The means for replacing may comprise an application specific integrated circuit, e.g., the processor 210 or the processor 304. The means for increasing may comprise an application specific integrated circuit, e.g., the processor 210 or the processor 304. The means for performing may comprise an application specific integrated circuit, e.g., the processor 210 or the processor 304. The means for tracking may comprise an application specific integrated circuit, e.g., the processor 210 or the processor 304. The means for disabling may comprise an application specific integrated circuit, e.g., the processor 210 or the processor 304. The means for broadcasting may comprise a transmitter, e.g., the transmitter 222, or the transmitter 310. The means for negotiating may comprise an application specific integrated circuit, e.g., the processor 210, the transceiver 222, the processor 304, or the transceiver 314 from FIG. 3 of the wireless device 302.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for communications, comprising:
a first circuit configured to allocate a first set of one or more streams within a multi-user (MU) frame for transmitting data associated with a primary Access Category (AC), wherein the first circuit is also configured to allocate a second set of one or more streams within the MU frame different from the first set for transmitting data associated with a secondary AC from a set of eligible ACs, once the first set comprises a largest number of streams among all numbers of streams that can be allocated for the data associated with the primary AC;
a second circuit configured to generate a random backoff count based on a contention window (CW) of the primary AC;
a third circuit configured to compute a hybrid backoff count based on the random backoff count and at least one of a size of the MU frame with only the data associated with the primary AC or a size of another MU frame with data associated with a hybrid AC comprising the data associated with the primary and secondary ACs;
a counter configured to perform backoff countdown with the hybrid backoff count; and
a transmitter configured to transmit the data associated with the primary and secondary ACs using the first and second sets of streams.

2. The apparatus of claim 1, wherein the first and second sets of streams are allocated such that duration of transmitting the data associated with the secondary AC does not exceed duration of transmitting the data associated with the primary AC.

3. The apparatus of claim 1, wherein duration of the MU frame does not exceed a transmission opportunity limit for the primary AC.

4. The apparatus of claim 1, wherein the set of eligible ACs is a function of the primary AC.

5. The apparatus of claim 1, wherein:
the primary AC and the secondary AC comprise at least one of: 802.11 AC Voice (AC VO), 802.11 AC Video (AC VI), 802.11 AC Best Effort (AC BE) data, or 802.11 AC Background (AC BK) data, and
a priority of 802.11 AC VO is higher than a priority of 802.11 AC VI, the priority of 802.11 AC VI is higher than a priority of 802.11 AC BE, and the priority of 802.11 AC BE is higher than a priority of 802.11 AC BK.

6. The apparatus of claim 1, wherein:
the secondary AC has a higher priority order than the primary AC, or
the secondary AC has at most one order of priority below the primary AC.

7. The apparatus of claim 1, wherein
the third circuit is also configured to compute the size of the other MU frame based on a number of bytes of the data associated with the primary AC, and
wherein the first circuit is also configured to allocate the second set of one or more streams within the MU frame such that a resulting size of the MU frame does not exceed the size of the other MU frame.

8. The apparatus of claim 1, further comprising:
a fourth circuit configured to track one or more parameters of the data associated with the primary AC; and
a fifth circuit configured to disable the transmission of the data associated with the secondary AC, if one or more of the parameters are not in compliance with Traffic Specification (TSPEC) requirements.

9. The apparatus of claim 1, wherein the numbers of streams that can be allocated comprise a number of streams of apparatuses expected to receive the data associated with the primary AC.

10. The apparatus of claim 1, wherein the first set comprises the one or more streams of another apparatus expected to receive the data associated with the primary AC.

11. An apparatus for communications, comprising:
a first circuit configured to allocate a first set of one or more streams within a multi-user (MU) frame for transmitting data associated with a primary Access Category (AC), wherein the first circuit is also configured to allocate a second set of one or more streams within the MU frame different from the first set for transmitting data associated with a secondary AC from a set of eligible ACs, once the first set comprises a largest number of streams among all numbers of streams that can be allocated for the data associated with the primary AC;
a second circuit configured to compute a size of the MU frame required for transmitting the data associated with the primary AC;
a third circuit configured to extend the computed size of the MU frame based on a tolerance parameter corresponding to an amount by which the size of the MU frame is allowed to increase due to addition of the data associated with the secondary AC;
a fourth circuit configured to negotiate the tolerance parameter with other apparatuses neighboring the apparatus;
a fifth circuit configured to adjust a backoff counter associated with the secondary AC to reduce a probability of winning contention for medium access for the secondary AC, wherein the adjustment of the backoff counter comprises at least one of:
restarting the backoff counter;
replacing a residual count of the backoff counter with a random value corresponding to a contention window (CW) of the secondary AC;
increasing a residual count of the backoff counter by an amount based on a CW of the primary AC and a CW of the secondary AC; or
increasing a residual count of the backoff counter by an amount based on an average throughput required for the secondary AC as defined by Traffic Specification (TSPEC) and a throughput of the data associated with the secondary AC; and
a transmitter configured to transmit the data associated with the primary and secondary ACs using the first and second sets of streams.

12. The apparatus of claim 11, wherein the transmitter is also configured to broadcast the tolerance parameter.

13. A method for communications, comprising:
allocating a first set of one or more streams within a multi-user (MU) frame for transmitting data associated with a primary Access Category (AC);
allocating a second set of one or more streams within the MU frame different from the first set for transmitting data associated with a secondary AC from a set of eligible ACs, once the first set comprises a largest number of streams among all numbers of streams that can be allocated for the data associated with the primary AC;
generating a random backoff count based on a contention window (CW) of the primary AC;
computing a hybrid backoff count based on the random backoff count and at least one of a size of the MU frame with only the data associated with the primary AC or a size of another MU frame with data associated with a hybrid AC comprising the data associated with the primary and secondary ACs;
performing backoff countdown with the hybrid backoff count; and
transmitting the data associated with the primary and secondary ACs using the first and second sets of streams.

14. The method of claim 13, wherein the first and second sets of streams are allocated such that duration of transmitting the data associated with the secondary AC does not exceed duration of transmitting the data associated with the primary AC.

15. The method of claim 13, wherein duration of the MU frame does not exceed a transmission opportunity limit for the primary AC.

16. The method of claim 13, wherein the set of eligible ACs is a function of the primary AC.

17. The method of claim 13, wherein:
the primary AC and the secondary AC comprise at least one of: 802.11 AC Voice (AC VO), 802.11 AC Video (AC VI), 802.11 AC Best Effort (AC BE) data, or 802.11 AC Background (AC BK) data, and
a priority of 802.11 AC VO is higher than a priority of 802.11 AC VI, the priority of 802.11 AC VI is higher than a priority of 802.11 AC BE, and the priority of 802.11 AC BE is higher than a priority of 802.11 AC BK.

18. The method of claim 13, wherein:
the secondary AC has a higher priority order than the primary AC, or
the secondary AC has at most one order of priority below the primary AC.

19. The method of claim 13, further comprising:
computing the size of the other MU frame based on a number of bytes of the data associated with the primary AC; and
allocating the second set of one or more streams within the MU frame such that a resulting size of the MU frame does not exceed the size of the other MU frame.

20. The method of claim 13, further comprising:
tracking one or more parameters of the data associated with the primary AC; and
disabling the transmission of the data associated with the secondary AC, if one or more of the parameters are not in compliance with Traffic Specification (TSPEC) requirements.

21. The method of claim 13, wherein the numbers of streams that can be allocated comprise a number of streams of apparatuses expected to receive the data associated with the primary AC.

22. The method of claim 13, wherein the first set comprises the one or more streams of an apparatus expected to receive the data associated with the primary AC.

23. A method for communication, comprising:
allocating a first set of one or more streams within a multi-user (MU) frame for transmitting data associated with a primary Access Category (AC);
allocating a second set of one or more streams within the MU frame different from the first set for transmitting data associated with a secondary AC from a set of eligible ACs, once the first set comprises a largest number of streams among all numbers of streams that can be allocated for the data associated with the primary AC;
computing a size of the MU frame required for transmitting the data associated with the primary AC;
extending the computed size of the MU frame based on a tolerance parameter corresponding to an amount by which the size of the MU frame is allowed to increase due to addition of the data associated with the secondary AC;
negotiating the tolerance parameter with neighboring apparatuses;
adjusting a backoff counter associated with the secondary AC to reduce a probability of winning contention for medium access for the secondary AC, wherein the adjustment of the backoff counter comprises at least one of:
restarting the backoff counter;
replacing a residual count of the backoff counter with a random value corresponding to a contention window (CW) of the secondary AC;
increasing a residual count of the backoff counter by an amount based on a CW of the primary AC and a CW of the secondary AC; or
increasing a residual count of the backoff counter by an amount based on an average throughput required for the secondary AC as defined by Traffic Specification (TSPEC) and a throughput of the data associated with the secondary AC; and
transmitting the data associated with the primary and secondary ACs using the first and second sets of streams.

24. The method of claim 23, further comprising:
broadcasting the tolerance parameter.

25. An apparatus for communications, comprising:
means for allocating a first set of one or more streams within a multi-user (MU) frame for transmitting data associated with a primary Access Category (AC);
means for allocating a second set of one or more streams within the MU frame different from the first set for transmitting data associated with a secondary AC from a set of eligible ACs, once the first set comprises a largest number of streams among all numbers of streams that can be allocated for the data associated with the primary AC;
means for generating a random backoff count based on a contention window (CW) of the primary AC;
means for computing a hybrid backoff count based on the random backoff count and at least one of a size of the MU frame with only the data associated with the primary AC or a size of another MU frame with data associated with a hybrid AC comprising the data associated with the primary and secondary ACs;
means for performing backoff countdown with the hybrid backoff count; and
means for transmitting the data associated with the primary and secondary ACs using the first and second sets of streams.

26. The apparatus of claim 25, wherein the first and second sets of streams are allocated such that duration of transmitting the data associated with the secondary AC does not exceed duration of transmitting the data associated with the primary AC.

27. The apparatus of claim 25, wherein duration of the MU frame does not exceed a transmission opportunity limit for the primary AC.

28. The apparatus of claim 25, wherein the set of eligible ACs is a function of the primary AC.

29. The apparatus of claim 25, wherein:
the primary AC and the secondary AC comprise at least one of: 802.11 AC Voice (AC VO), 802.11 AC Video (AC VI), 802.11 AC Best Effort (AC BE) data, or 802.11 AC Background (AC BK) data, and
a priority of 802.11 AC VO is higher than a priority of 802.11 AC VI, the priority of 802.11 AC VI is higher than a priority of 802.11 AC BE, and the priority of 802.11 AC BE is higher than a priority of 802.11 AC BK.

30. The apparatus of claim 25, wherein:
the secondary AC has a higher priority order than the primary AC, or
the secondary AC has at most one order of priority below the primary AC.

31. The apparatus of claim 25, further comprising:
means for computing the size of the other MU frame based on a number of bytes of the data associated with the primary AC; and
means for allocating the second set of one or more streams within the MU frame such that a resulting size of the MU frame does not exceed the size of the other MU frame.

32. The apparatus of claim 25, further comprising:
means for tracking one or more parameters of the data associated with the primary AC; and
means for disabling the transmission of the data associated with the secondary AC, if one or more of the parameters are not in compliance with Traffic Specification (TSPEC) requirements.

33. The apparatus of claim 25, wherein the numbers of streams that can be allocated comprise a number of streams of apparatuses expected to receive the data associated with the primary AC.

34. The apparatus of claim 25, wherein the first set comprises the one or more streams of another apparatus expected to receive the data associated with the primary AC.

35. An apparatus for communications, comprising:
means for allocating a first set of one or more streams within a multi-user (MU) frame for transmitting data associated with a primary Access Category (AC);
means for allocating a second set of one or more streams within the MU frame different from the first set for transmitting data associated with a secondary AC from a set of eligible ACs, once the first set comprises a largest number of streams among all numbers of streams that can be allocated for the data associated with the primary AC;
means for computing a size of the MU frame required for transmitting the data associated with the primary AC;
means for extending the computed size of the MU frame based on a tolerance parameter corresponding to an amount by which the size of the MU frame is allowed to increase due to addition of the data associated with the secondary AC;
means for negotiating the tolerance parameter with other apparatuses neighboring the apparatus;
means for adjusting a backoff counter associated with the secondary AC to reduce a probability of winning contention for medium access for the secondary AC,
wherein means for adjusting the backoff counter comprises at least one of:
means for restarting the backoff counter;
means for replacing a residual count of the backoff counter with a random value corresponding to a contention window (CW) of the secondary AC;
means for increasing a residual count of the backoff counter by an amount based on a CW of the primary AC and a CW of the secondary AC; or
means for increasing a residual count of the backoff counter by an amount based on an average throughput required for the secondary AC as defined by Traffic Specification (TSPEC) and a throughput of the data associated with the secondary AC; and
means for transmitting the data associated with the primary and secondary ACs using the first and second sets of streams.

36. The apparatus of claim 35, wherein the means for transmitting is further configured to broadcast the tolerance parameter.

37. A non-transitory computer-readable medium comprising instructions executable to:
allocate a first set of one or more streams within a multi-user (MU) frame for transmitting data associated with a primary Access Category (AC);
allocate a second set of one or more streams within the MU frame different from the first set for transmitting data associated with a secondary AC from a set of eligible ACs, once the first set comprises a largest number of streams among all numbers of streams that can be allocated for the data associated with the primary AC;
generating a random backoff count based on a contention window (CW) of the primary AC;
computing a hybrid backoff count based on the random backoff count and at least one of a size of the MU frame with only the data associated with the primary AC or a size of another MU frame with data associated with a hybrid AC comprising the data associated with the primary and secondary ACs; and
performing backoff countdown with the hybrid backoff count.

38. An access point, comprising:
at least one antenna;
a first circuit configured to allocate a first set of one or more streams within a multi-user (MU) frame for transmitting data associated with a primary Access Category (AC), wherein the first circuit is also configured to allocate a second set of one or more streams within the MU frame different from the first set for transmitting data associated with a secondary AC from a set of eligible ACs, once the first set comprises a largest number of streams among all numbers of streams that can be allocated for the data associated with the primary AC;
a second circuit configured to generate a random backoff count based on a contention window (CW) of the primary AC;
a third circuit configured to compute a hybrid backoff count based on the random backoff count and at least one of a size of the MU frame with only the data associated with the primary AC or a size of another MU frame with data associated with a hybrid AC comprising the data associated with the primary and secondary ACs;
a counter configured to perform backoff countdown with the hybrid backoff count; and a transmitter configured to transmit, via the at least one antenna, the data associated with the primary and secondary ACs using the first and second sets of streams.

39. A non-transitory computer-readable medium comprising instructions executable to:
allocate a first set of one or more streams within a multi-user (MU) frame for transmitting data associated with a primary Access Category (AC);
allocate a second set of one or more streams within the MU frame different from the first set for transmitting data associated with a secondary AC from a set of eligible ACs, once the first set comprises a largest number of streams among all numbers of streams that can be allocated for the data associated with the primary AC;
compute a size of the MU frame required for transmitting the data associated with the primary AC;
extend the computed size of the MU frame based on a tolerance parameter corresponding to an amount by which the size of the MU frame is allowed to increase due to addition of the data associated with the secondary AC;
negotiate the tolerance parameter with neighboring apparatuses; and
adjust a backoff counter associated with the secondary AC to reduce a probability of winning contention for medium access for the secondary AC, wherein the adjustment of the backoff counter comprises at least one of:
replacing a residual count of the backoff counter with a random value corresponding to a contention window (CW) of the secondary AC;
increasing a residual count of the backoff counter by an amount based on a CW of the primary AC and a CW of the secondary AC; or
increasing a residual count of the backoff counter by an amount based on an average throughput required for the secondary AC as defined by Traffic Specification (TSPEC) and a throughput of the data associated with the secondary AC.

40. An access point, comprising:
at least one antenna;
a first circuit configured to allocate a first set of one or more streams within a multi-user (MU) frame for transmitting data associated with a primary Access Category (AC), wherein the first circuit is also configured to allocate a second set of one or more streams within the MU frame different from the first set for transmitting data associated with a secondary AC from a set of eligible ACs, once the first set comprises a largest number of streams among all numbers of streams that can be allocated for the data associated with the primary AC;
a second circuit configured to compute a size of the MU frame required for transmitting the data associated with the primary AC;
a third circuit configured to extend the computed size of the MU frame based on a tolerance parameter corresponding to an amount by which the size of the MU frame is allowed to increase due to addition of the data associated with the secondary AC;
a fourth circuit configured to negotiate the tolerance parameter with other apparatuses neighboring the apparatus;
a fifth circuit configured to adjust a backoff counter associated with the secondary AC to reduce a probability of winning contention for medium access for the secondary AC, wherein the adjustment of the backoff counter comprises at least one of:
restarting the backoff counter;
replacing a residual count of the backoff counter with a random value corresponding to a contention window (CW) of the secondary AC;
increasing a residual count of the backoff counter by an amount based on a CW of the primary AC and a CW of the secondary AC; or
increasing a residual count of the backoff counter by an amount based on an average throughput required for the secondary AC as defined by Traffic Specification (TSPEC) and a throughput of the data associated with the secondary AC; and
a transmitter configured to transmit, via the at least one antenna, the data associated with the primary and secondary ACs using the first and second sets of streams.

* * * * *